Dec. 26, 1939.  C. J. CLARKE  2,184,792
ARTIFICIAL BAIT OR LURE
Filed Aug. 3, 1938
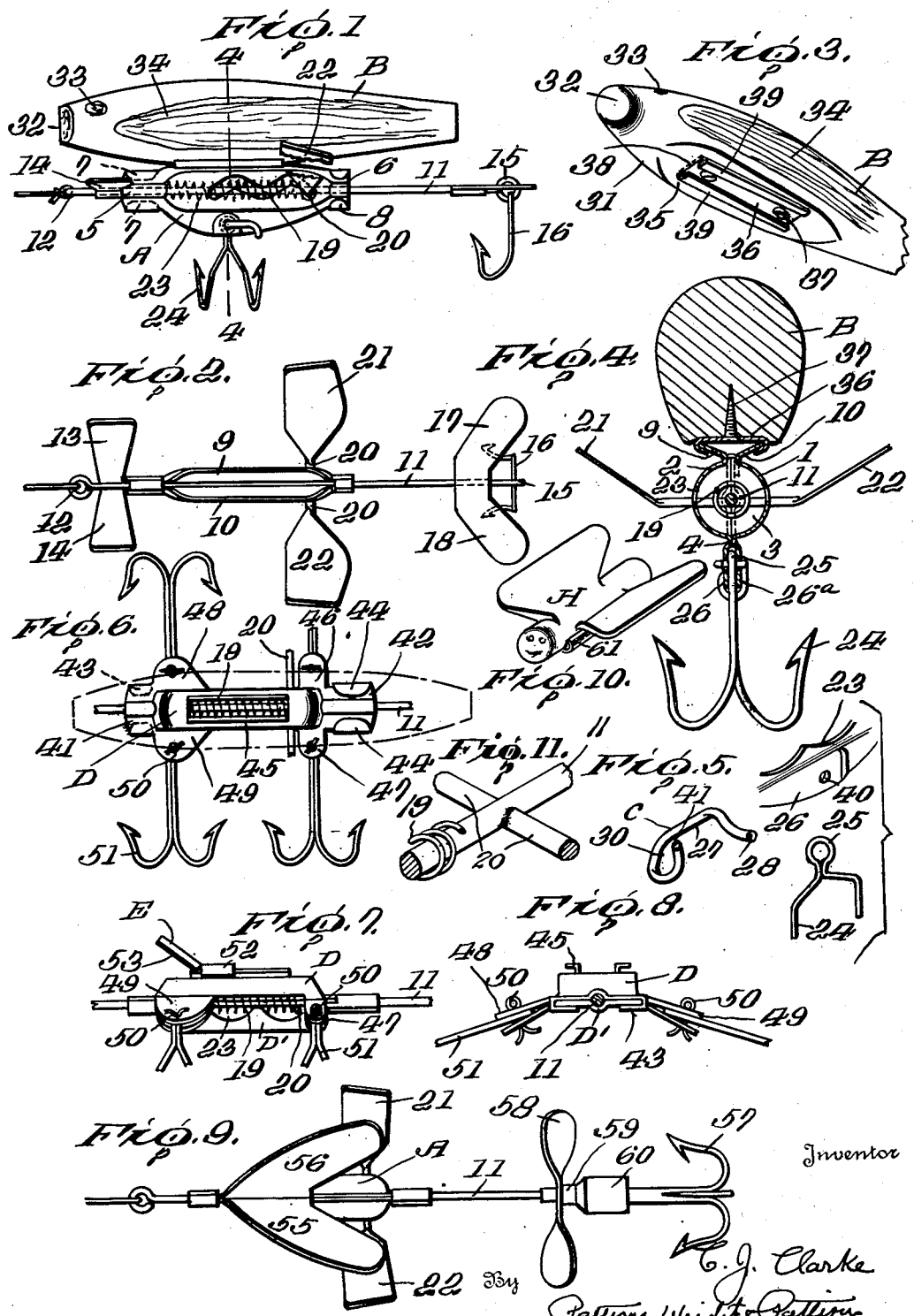

Patented Dec. 26, 1939

2,184,792

UNITED STATES PATENT OFFICE 2,184,792

ARTIFICIAL BAIT OR LURE

Charles Jackson Clarke, Kingsburg, Calif.

Application August 3, 1938, Serial No. 222,908

20 Claims. (Cl. 43—46)

This invention relates to an improved artificial bait or lure and pertains more particularly and specifically to an artificial bait intended to symbolize a crippled minnow or some other form of crippled life such as fish are prone to feed upon.

The primary object of the invention is the provision of an improved bait or lure constructed in a manner to symbolize through intermittent fluttering a crippled minnow or some other form of life upon which fish tend to feed.

A still further object of the invention is the provision of a device having the aforementioned attributes in which there is an actuating mechanism to which floating or float lures of varying kinds and form can be quickly applied or attached.

A still further object of the invention is the provision of an improved actuating mechanism for a float lure by use of which a fluttering motion is imparted to the float lure so as to cause the same to symbolize a crippled minnow or the like.

A still further object of the invention is the provision of an actuating device for an artificial bait which is constructed in a cheap and simple manner yet is highly efficient in operation.

Another and still further object of the invention is the provision of a novel means of attaching fish hooks to the actuating mechanism of the device and in certain forms of the invention to utilize the fish hooks as a means of securing together the parts constituting the body of the actuating mechanism.

Other and further novel features of construction and improved results of the invention will appear in more detail from the following description when read in the light of the accompanying drawing.

In the drawing:

Fig. 1 is a view in side elevation of one form of the improved device.

Fig. 2 is a top plan view of the device appearing in Fig. 1, the float lure having been removed.

Fig. 3 is a perspective view in bottom elevation of the float lure which appears applied to the actuating device in Fig. 1 of the drawing.

Fig. 4 is a vertical sectional view taken on the line 4—4 of Fig. 1.

Fig. 5 is a strung-out perspective view illustrating the manner of attachment of fish hooks to the bait actuator.

Fig. 6 is a top plan view of a modified form of bait.

Fig. 7 is a view in side elevation of the Fig. 6 form of bait.

Fig. 8 is an end view of the actuator appearing in Fig. 7 of the drawing.

Fig. 9 is a top plan view of a still further modified form of the invention.

Fig. 10 is a perspective view of another and further modified form of float lure.

Fig. 11 is a perspective view of a detail.

Having reference now to the drawing and particularly Figures 1 to 4 inclusive, A designates as an entirety the actuating mechanism and B the float lure.

The actuating mechanism is preferably made of light gauge metal which can be easily stamped or bent into the desired and necessary form and comprises two body portions 1 and 2 (see Fig. 4 of the drawing) which are bent or bulged outwardly to form a housing or chamber 3. At their lower edges these body portions are in abutment as indicated at 4 and at their front and rear ends the body portions are in abutment as indicated at 5 and 6. The two main body portions 2 and 3 are secured together by providing at the ends of the body portions tongues 7 and 8 which are bent inwardly and downwardly to clamp the abutting end portions of the main body portions together. At their upper edges and extending throughout the greater length of the actuator body portions the members making up the body are flared upwardly and outwardly as indicated at 9 and 10 and which appears most clearly in Figs. 2 and 4 of the drawing.

A shaft 11 extends throughout the length of the actuator chamber 3 and beyond its front and rear ends. At its front end the shaft 11 is provided with an eye 12 to which is secured the free end of the fish line which runs to the fish pole (not shown). Immediately behind the eye 12 and rigidly secured to the shaft are a pair of blades 13 and 14 which blades might be called, for lack of a better name, a spinner. At its rear end the shaft is provided with an eye 15 to which is secured a fish hook 16 which may be double pronged as shown or could be of a single prong and could equally as well be covered with feathers or the like for concealment. Immediately in front of the eye 15 a second pair of fins or blades 17 and 18 are rigidly secured to the shaft and again might well be termed a spinner.

A coil spring 19 is disposed within the housing 3 and about the shaft 11. The rear end of this spring abuts the arms 20 of the blades 21 and 22 at the point where said arms are rigidly attached to the shaft. The blades 21 and 22 are intended to represent the side fins of a minnow or small fish and their arm portions 20 extend outwardly through the openings 23 provided in each of the actuator body members 2 and 3. These openings are in the form of elongated slots each of which forms a tortuous passageway. A second fish hook 24 is suspended from the bottom of the actuator and by reference to Figs. 1 and 4 of the drawing it will be seen that the eye 25 of the hook is disposed between the lower portions 26 and 26a of the body portions 2 and 3 and that a member designated as an entirety by C (Fig. 5) secures this fish hook in place and also serves as a further means for securing the actuator body portions together. The member C which might well be termed a securing link is of tubular form such as a wire and has a center straight portion 27 and an outwardly extending end portion 28 which passes through the lower edge of both of the lower edges 26 and 26a and also through the eye 25 of the fish hook 24. At its other end the link is curved as shown to provide a space 30 which receives and clamps under resilient tension the lower edges 26 and 26a respectively of the actuator body members 1 and 2.

The lure B is illustrated individually in Fig. 3 of the drawing and is intended to be made of wood so as to float the metallic parts thus far described, although it is to be understood that the float lure or bait could be made hollow and of metal and still function as a float. The form of life which the float lure is intended to symbolize can be varied at will to suit the particular type of fish being sought. In the present instance the lure is intended to symbolize a minnow and for the most part is painted or colored yellow as indicated at 31 with a red nose 32, red eyes 33 and a partly red tail 34. At its under side the lure is flattened as at 35 to which is suitably secured a clip 36 which has a larger entry end 37 than its forward end 38. By reference to Fig. 4 of the drawing it will be seen that this lure can be rapidly attached to and detached from the actuator by a rearwardly and forwardly sliding movement with the flared portions 9 and 10 at the top edge of the actuator body having a sliding engagement under the inturned edges 39 of the clip 36.

To prevent accidental displacement of the link C the bottom edge 26 is provided with an indenture 40 which receives the outer-most end 41 of the curved portion 29 of the link.

From the foregoing description, the operation of the particular bait or lure illustrated in Figs. 1 to 5 of the drawing, should be readily understandable. It will be apparent that the lure B will float the actuating mechanism and the hooks and that the complete device can be used in "casting." With the lure floating upon the surface of the water it can be made to appear as a crippled minnow by merely a flick of the end of the fishing rod. This motion will impart a jerk or pull to the shaft 11 and pull the same forwardly through the actuator body housing 3 and build up a tension in the coil spring 19. As the shaft is moved forward the fins or wings 21 are caused to oscillate due to the movement of their arm portions 20 along the zigzag passageway 23. The oscillation of the fins will cause the float lure and actuator to flutter or wabble which movement will tend to attract the notice of the fish and will give to them the impression that the bait is a crippled one. As soon as the forward movement of the shaft 11 has been accomplished and the line from the bait to the fishing rod is slackened the coil spring will force the shaft 11 rearwardly and the wabbling or floating movement of the bait will be automatically repeated. The oscillating movement imparted to the shaft will also impart a similar movement to the blades 13, 14, 17 and 18 which will also therefore assist in imparting a fluttering motion to the bait and inasmuch as these members will be composed of a polished or bright material their movement will also attract the attention of any fish in the vicinity.

Referring now to the modified form of the invention appearing in Fig. 6 of the drawing, it will be seen that it has a great similarity to the preferred form heretofore described and where similar parts are utilized similar reference numerals will be applied. The main differences of this modified form of the invention are in the manner of constructing the actuator body and the attachment of the fish hooks thereto.

In the preferred form of the invention the two parts or members making up the actuator body lie in a vertical plane and extend downwardly from the under side of the lure, whereas in this modified form the two body parts making up the actuator are disposed in a horizontal plane beneath the lure. A top plan view only of this form of the actuator appears in the drawing, but the construction should be readily understood when it is explained that there is a top actuator body portion designated as an entirety by D and that there is a body bottom portion having the exact configuration and that these body portions have their front and rear ends 41 and 42 respectively in abutment and secured together by clamping down the integrally formed tongues 43 carried by the bottom member and 44 carried by the top member. Intermediate their abutting ends these bottom and top members making up the actuator are in separated relationship to form a chamber similar to the hereinbefore referred to chamber 3 and through this chamber passes the shaft 11 about which, within the chamber, is disposed the coil spring 19. Although it is not illustrated the shaft 11 at its front end is provided with the eye 12 and the blades 13 and 14, while at its rear end it is provided with the eye 15 carrying the fish hooks 16 and forwardly of the eye with the blades 17 and 18. The top actuator housing part D is provided with a longitudinally extending opening the edges of which are flared upwardly and outwardly as at 45 to provide flanges which telescope the flanges 39 of the clip 36 carried by the under side of the lure. It is to be noted that the opening narrows at its front end and widens at its rear end so that the lure clip can be slid rearwardly on to the actuator for securement thereto under a wedging action.

The parts making up the top and bottom of the actuator are provided adjacent their front ends with oppositely positioned ears 46 and 47 and adjacent their rear ends with oppositely positioned ears 48 and 49. Cotter keys 50 pass through the superposed ears and by reference to Fig. 7 of the drawing, it will be seen that a fish hook 51 is secured between each of the ears by said cotter keys with the result that the cotter keys not only secure the fish hooks to the actuator, but also serve as a further means of securing the top and bottom portions of the actuator mechanism together.

In Fig. 6 of the drawing the hereinbefore described lure B is illustrated as being attached to the actuator. Fig. 7 is a side view of the modified form of actuator appearing in Fig. 6 of the drawing with the exception that a modified form of lure E is shown applied to the actuator in place of or substitution for the lure B. Further reference to Figs. 6 and 7 it will be seen that the arms 20 of the fins 21 and 22 pass through the zigzag side opening 23 in the side of the bottom member D' of the actuator body with the result that the actuator and lure illustrated in Fig. 6 can be caused to flutter or wabble as has been explained in respect to that form of the invention appearing in Figs. 1 to 4 inclusive.

No explanation of the actuator or its construction as appearing in Figs. 7 and 8 of the drawing is needed, as they are illustrations of the actuator appearing in Fig. 6 of the drawing and, therefore, the description of Fig. 7 will be limited to the lure E. From the explanation thus far given, it will be apparent that lures of different kinds and forms can be utilized with the actuators. All the lures thus far described are of the float type. In Fig. 7 of the drawing is illustrated an artificial bait which does not have a float lure. This bait is used for sub-surface reeling, and is not used for surface, trolling or reeling as float lures are used for this type of fishing. The lure E is a metallic plate having a horizontal base portion 52 with downwardly and inwardly turned side edges which telescopically receive the flanges 45 on the top member D of Fig. 6 form of actuator. It is to be understood, however, that the base member 52 could be properly shaped for attachment to Fig. 1 form of actuator. An inclined plate 53 extends upwardly and forwardly from the base 52 and is preferably bent so that it is high in the middle and low at its edges. That is to say, it is V-shaped in cross section, but the inclination of the arms of the V in respect to one another is not acute.

It is to be understood that the use of float lures with the actuators is not necessary as the actuators constitute a complete bait within themselves. When the float lures are not utilized the actuators will of course sink in the water. The forward fins or blades on the actuators are inclined upwardly with the result that by slow reeling the actuator will be used for sub-surface or comparatively deep fishing while rapid reeling or trolling will, due to the inclined fins, cause the actuator to rise towards the surface of the water and permit maintenance of the actuator just below the surface of the water.

In Fig. 9 of the drawing a bait is illustrated in which no lure whatsoever is used. This bait is designed particularly for salmon and bass fishing. When utilized for salmon fishing a weight should be attached to the actuator for keeping it near the bed or bottom of the stream of flowing water as salmon are prone to strike that which appears to menace their spawn.

The construction in Fig. 9 is very similar to that previously described in that the actuator A itself is similar in construction to the actuators shown in Figs. 1 to 4 of the drawing with the exception that a pair of wing-like members 55 and 56 are formed as a part of the actuator side body portions 1 and 2 at the upper edges thereof and extend outwardly and rearwardly as clearly shown. These wings or top fins are given an inclination so as to cause the actuator to rise upon being moved forwardly through the water. There is the same heretofore referred to shaft 11 passing through the actuator body and within the body is the spring mechanism previously described for causing oscillation of the side fins or blades 21 and 22. At the rear end of the shaft is a hook 57 and a propeller 58 is mounted for free rotation on the shaft. The hub 59 of this propeller abuts a cone-like member 60 which covers the attachment between the hook and the end of the shaft and guards the propeller against being jammed or interfered with by said connection.

It is to be understood and recognized that lures in different forms to symbolize different types of life could be multiplied without end and provided for use with actuators. In Fig. 10 of the drawing another suggested form of float lure is illustrated and designated as an entirety as H. This lure is of the float type and is intended to symbolize a butterfly and is provided on its under side with a clip 61 similar to the hereinbefore described clip 36.

From a consideration of the foregoing description and the accompanying drawing it will be seen that I have provided a very novel artificial bait which is extremely cheap and simple of manufacture and yet has many novel and desirable attributes. The bait will lead to great success of the fisherman's efforts in that it will symbolize a crippled minnow or other form of crippled life which is a type of bait particularly attractive to fish. Furthermore due to the novel motor or actuating means the fluttering motion can be imparted to the bait by a minimum of effort on the part of the fisherman. Furthermore the fisherman's cost of artificial bait will be materially reduced in that he can utilize the same actuating mechanism with any one of a plurality of different forms of lure and the transition of the bait from one type to another can be accomplished with a minimum of effort. The manner of forming the actuator attributes to the low cost of manufacture and at the same time enables the actuator to be quickly taken apart. A further advantage is found in the manner of attaching the fish hooks which enables them to be changed or renewed with a minimum of effort.

The connection between the arms 20 of the blades 21 and 22 and the shaft 11 can be of any conventional nature insolong as the arms are rigidly secured to the shaft. The drawing is intended to indicate the arms as being welded to the shaft. A welded connection can be obtained equally as well when the arms abut the sides of the shaft as illustrated in Figs. 4 and 10 of the drawing as when the arms abut the under side of the shaft as illustrated in Fig. 7 of the drawing. Provision of a rigid connection between these parts requires no inventive skill and can be effected in the manner illustrated in the drawing or by any other obvious and conventional arrangement.

I claim:

1. In an artificial bait, a metallic actuating mechanism having outwardly extending fins, a fishing line attached to said bait, motor means carried by said bait for oscillating said fins, said motor means being caused to operate upon movement of said bait by said fishing line, and a float lure having quick detachable connection with said actuating mechanism and positioned upon the top thereof the float lure supporting said actuating mechanism immediately beneath the surface of the water.

2. An artificial bait comprising an actuating mechanism having a longitudinally movable shaft attached to a fishing line, resilient means normally resisting forward movement of said shaft when a pull is exerted upon said fishing line, fins attached to said shaft and extending outwardly to each side of said actuating mechanism, a lure carried by the upper side of said actuating mechanism, and means to cause said fins to oscillate upon movement of said shaft in either a forwardly or rearwardly direction, the parts operating as and for the purpose described.

3. An artificial bait of the construction defined in claim 2, wherein the actuating mechanism is of metallic construction and said lure is a float for supporting said actuating mechanism immediately beneath the surface of the water.

4. An artificial bait constructed as defined in claim 2, wherein the lure is a float having quick detachable connection with the actuating mechanism and is disposed upon the upper side thereof and supports the actuating mechanism immediately beneath the surface of the water.

5. An artificial bait comprising an actuating mechanism provided with means for causing the oscillation thereof upon movement of the mechanism through the water, said mechanism at its upper side provided with upwardly and outwardly extending flanges, and a lure having at its under side flanges adapted to cooperate with flanges on said actuated mechanism to provide quick detachable connection of the lure to the actuator, for the purpose described.

6. An artificial bait constructed as defined in claim 5, wherein the actuator is composed of a material which will sink in water and the lure is a float which will maintain the actuating mechanism immediately beneath the surface of the water.

7. An improved artificial bait comprising, an actuator composed of a pair of metallic plates arranged in face to face abutting relationship throughout a portion of their areas and forming between them a chamber, means securing said plates together, means within said chamber for causing said actuator to be oscillated upon movement of the actuator through the water, a portion of the upper edges of said plates bent upwardly and outwardly from one another to form flanges, and a lure symbolizing some form of life and provided with flanges cooperating with said first-named flanges for providing quick detachable connection between said lure and said mechanism.

8. A construction such as defined in claim 7, wherein the lure is a float and will support said mechanism immediately beneath the surface of the water.

9. A construction such as defined in claim 7, wherein the plates are provided with ears which are bent and clamped downwardly to provide means which secure the plates together.

10. An improved artificial bait comprising, an actuator composed of a pair of plates arranged in superposed relationship and having abutments one with the other throughout a portion of their areas, said plates forming between them a centrally disposed chamber, means disposed within the said chamber and provided with outwardly extending fins adapted to oscillate said actuator upon movement of the same through the water, and a lure having quick detachable connection with the upper of said plates.

11. A construction such as defined in claim 10 wherein, the lure symbolizes some form of life and is a float which supports the actuating mechanism immediately beneath the surface of the water.

12. A construction such as defined in claim 10 wherein, the plates are formed with ears adapted to be bent downwardly and clamped to secure the plates together.

13. A construction such as defined in claim 10 wherein, a plurality of fishing hooks each have a portion disposed between the abutting areas of the plates, and means passing through said fish hook portion and plate areas above and below the same for securing said fish hooks to the actuator and for securing the plates of the actuator together.

14. An artificial bait comprising in combination, an actuator mechanism provided with means to cause the same to flutter when the mechanism is moved through the water, and a float lure symbolizing some form of life and having a slidable quick detachable connection with the said actuator mechanism to support the same immediately beneath the surface of the water.

15. An artificial bait comprising a metallic actuating mechanism to which a fishing line is attached, a member of said mechanism movable backward and forward and oscillating, fins operatively connected with said member whereby they are oscillated when the bait is moved backward and forward, and a longitudinally extending float lure located in a horizontal plane at one side of said mechanism and having a slidable quickly detachable connection with said mechanism.

16. An artificial bait comprising a floatable lure, a chamber below said lure and connected with the under side thereof, a shaft passing longitudinally through said chamber and having a fishing line connected to its forward end, said shaft having a backward and forward and oscillating movement, and fins having extensions passing into the chamber and operatively connected with said shaft for causing the fins to oscillate by the backward and forward movement of said shaft.

17. An artificial bait comprising a floating lure, a chamber attached to the under side of the said lure, a shaft passing longitudinally through said chamber and movable backward and forward therein, said chamber having at opposite sides a longitudinally extending zig-zag opening, and fins having extensions passing through said zig-zag openings and engaging the walls thereof, said fins being connected with said shaft whereby the fins are oscillated through the movement of the said shaft.

18. An artificial bait comprising a chamber having a shaft passing longitudinally through said chamber and attached at its forward end to a fishing line, said shaft having longitudinal movement and also an oscillating movement at right angles to said longitudinal movement, and fins having extensions into the said chamber and said extensions being connected with said shaft, said chamber having longitudinal openings in its side walls, the extensions of the fins passing through the said openings, and the walls being so shaped as to cause an oscillation of the fins and the shaft by the backward and forward movement of said shaft.

19. An artificial bait comprising, a float lure symbolizing some form of life, a separate actuating mechanism provided with means to cause the same to flutter when the bait is moved through the water, and said float lure and actuating mechanism having quick detachable connection one with the other whereby lures symbolizing different forms of life can be attached to said actuating mechanism.

20. An artificial bait comprising, a member having a shaft passing longitudinally therethrough and movable backwardly and forwardly therein, said shaft adapted to be attached to a fish line and to be moved forwardly by a pull thereupon, resilient means resisting the forward movement of the shaft and moving said shaft rearwardly when the pull upon the fish line is discontinued, fins at the opposite sides of said member and having extension portions passing through and engaging the walls of openings formed in the opposite sides of said member, and the engagement of said fin extensions with the wall openings causing the fins and shaft to oscillate when said shaft is moved forwardly and rearwardly as described.

CHARLES JACKSON CLARKE.